Jan. 2, 1940.  R. STUART  2,185,233
SELECTIVE INDEXING SYSTEMS
Filed July 24, 1936    4 Sheets-Sheet 1
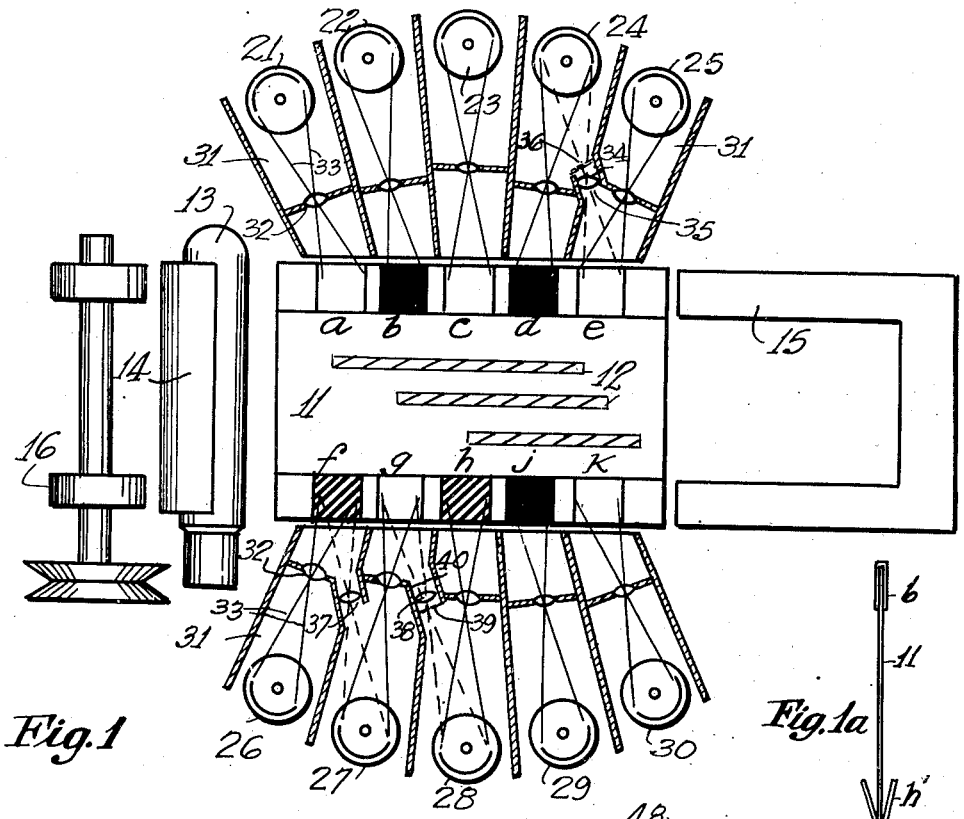
Fig.1
Fig.1a
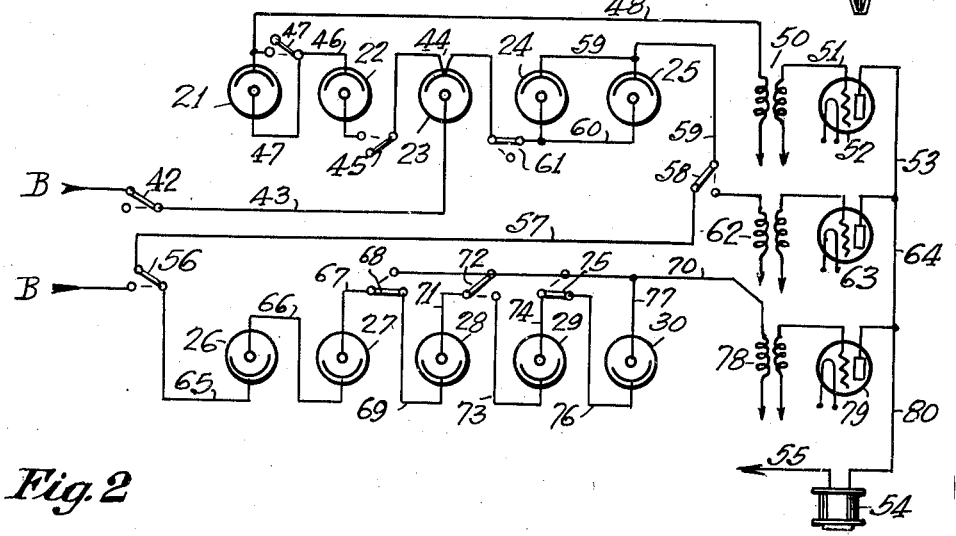
Fig.2
INVENTOR.
Robert Stuart,
BY M. H. Loughridge
ATTORNEY.

Jan. 2, 1940.     R. STUART     2,185,233
SELECTIVE INDEXING SYSTEMS
Filed July 24, 1936     4 Sheets-Sheet 2

INVENTOR.
Robert Stuart,
BY
ATTORNEY.

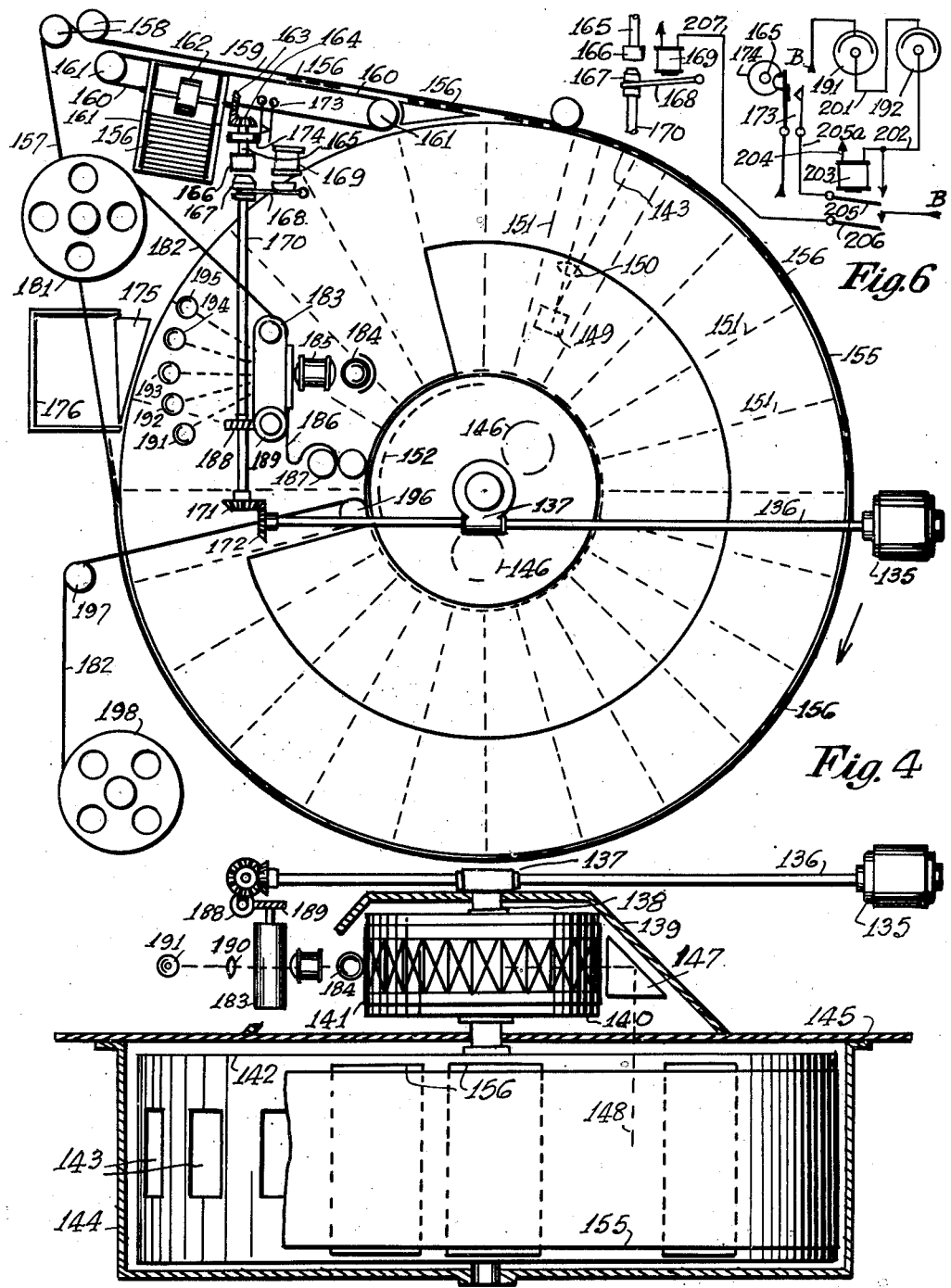

Patented Jan. 2, 1940

2,185,233

UNITED STATES PATENT OFFICE 2,185,233

SELECTIVE INDEXING SYSTEMS

Robert Stuart, Forest Hills, Long Island, N. Y.

Application July 24, 1936, Serial No. 92,271

16 Claims. (Cl. 88—24)

This invention relates to indexing systems and to means for selectively transferring the subject of the index for commercial use and making the index readily available. An object of the invention is to provide the index cards with characteristic markings whereby they may be selectively used. A further object of the invention is to transfer the subject of a motion picture film photographically to sheets of paper stock; another object of the invention is to selectively transfer the subjects of the motion picture film by markings on the film itself. The invention further includes means for transferring the subject of a stack of marked index cards to a motion picture film, selectively controlled by the markings of the cards, and to transfer the subjects of each frame of the motion picture film, photographically, to sheets of paper stock and selectively controlled by markings on the film. Another object of the invention is to provide means for utilizing a card index system selectively controlled by photo-electric cells. Other objects of the invention will be more particularly understood from the following specification and the accompanying drawings, in which Fig. 1 is a diagram of the apparatus, partly sectioned, showing the index card and the arrangement of the photo-electric cells for scanning the card;

Fig. 2 is a circuit diagram of a variety of electric controls that may be obtained from the arrangement in Fig. 1 for selectively operating the system;

Fig. 1a is an end view of an index card showing the method of attaching the tabs for giving the characteristic markings to the card;

Fig. 4 is a view of a printing wheel for photographically printing paper sheets or envelopes from a motion picture film which is selectively controlled by markings on the film, the drawing being largely diagrammatic;

Fig. 5 is a side elevation of the mechanism in Fig. 4 with the cover sectioned and parts broken away to show the construction;

Fig. 6 is a circuit diagram of the electrical control used in Fig. 4;

Figure 3:
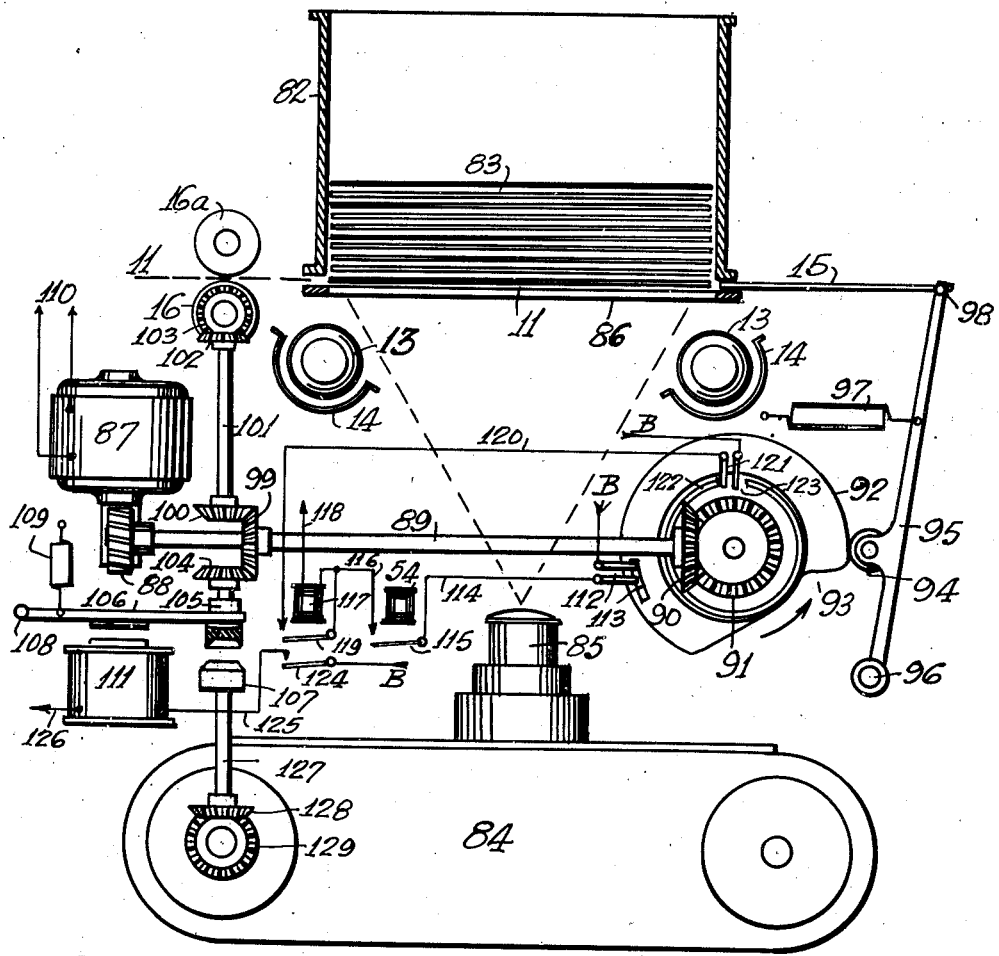
Fig. 3 is a diagrammatic drawing, partly sectioned, showing the motion picture camera photographing the stack of index cards and the automatic control thereof.

In my co-pending application, Serial No. 47,040, filed October 28, 1935, which has matured into Patent Number 2,081,187 issued May 25, 1937, I have shown means for transferring the subject of a stack of index cards to a motion picture film, a printing wheel for printing the subject of the film photographically, on envelopes or paper sheets and also a paper feeding mechanism for the printing wheel. In the present invention, which is a continuation in part of this co-pending application, I provide means for selectively transferring the subject of the card index to the film and further means for selectively transferring the subject of each frame of the film to the envelope or other document as required. In each case the selection is obtained by the use of photo-electric cells responsive to markings on the cards or on the film.

The invention is described in connection with a card index system arranged for mailing purposes but it is readily adapted for any of the numerous conditions to which index cards are applied. In a mailing system it may be desirable to select cards addressed to men only, or to women only, or again, cards may be selected locally or nationally. This generally leads to a selective system in which there is a master group divided into one or more sub-groups and these sub-groups may again be further divided so that the system must be capable of being set up for a variety of selections.

This is secured by providing the margin of the index card with a series of removable tabs located on the card with relation to a particular characteristic. In a simple form the card may be white with a surface that reflects light and the tab may be black with a surface that absorbs light. The card is suitably illuminated and the portion of the card where the tab is, is scanned by a photo-electric cell. This cell may be constructed to establish a circuit when light falls thereon, or it may be constructed to interrupt a circuit under the same conditions. In the former case it is apparent that when the margin tab is absent the light reflected from the card will influence the cell to establish the controlling circuit and, on the other hand, when a card is scanned which has a tab that does not reflect light, the circuit through the photo cell cannot be established.

A double row of tabs may be provided on the card so that a number of photo-electric cells are scanning the card at the same time and by suitably arranging the circuit controlled by these cells an extensive selective system is secured. The photo-electric cell is made in different degrees of sensitivity so that one cell may be responsive to a less intense light than another cell and advantage is taken of this fact by providing tabs having different degrees of light reflecting qualities so that the system may be made selective by changing the type of photo-electric cells used.

The index is first prepared on cards in the usual manner and these cards are provided with tabs according to the information that is desired in the index. The tabs may be stamped on the card or may be made removable so that the card can easily be changed. A stack of these cards is placed in a container, face down, the container having an aperture in the bottom in register with the lens of a motion picture camera. A motor operated mechanism, through a cam action, removes the cards one at a time and leaves an interval for photographing each card on the frame of the film. The camera through a clutch mechanism is operated by the motor in synchronism with the card removing mechanism and the clutch is controlled by the photo-electric cells so that when a card is not to be transferred to the film the camera is de-clutched from the mechanism and remains inactive; in this way a particular group or sub-group of cards are transferred to the frames of the film, in a continuous row.

When used for addressing envelopes or similar work, an enlargement of the film frames is printed by means of the printing wheel upon the sensitized face of the envelope as the wheel rotates. In practice, it may arise that a further selection is required between the film and the envelopes so that particular frames of the film will not be used. For this purpose a paper feeding mechanism is provided for feeding the envelopes, one at a time, to the printing wheel and this feeding mechanism is controlled by a clutch which is, in turn, controlled by photo-electric cells scanning the markings on each frame of the film as these markings are enlarged through a projecting apparatus. The apparatus is so arranged that when the subject of a frame is not required the paper feeding mechanism omits the corresponding paper that would have been printed by this frame while the continuous film is fed forward one frame at a time, but transference is made only of the particular frames of the film desired. The film is thus continuously operated while the paper feed operates selectively.

In the drawings 11 is the index card with the address or information indicated at 12 and having the marking tabs a, b, c, d and e at the top of the card and the marking tabs f, g, h, j, k at the bottom of the card. The tabs may be applied to the card in any suitable manner but are preferably clamped to the cards as indicated in Fig. 1a at b and h' so that they can readily be removed or changed. The card is illuminated by one or more lamps 13, provided with reflectors 14 and it is removed from the stack by the slide 15 which moves the card onto the roller 16.

A frame is provided along the upper edge of the card having apertures 31 registering with each of the tabs a, b, c, d, and e, and in each frame one of the photo cells 21, 22, 23, 24 and 25 is located, with a lens 32 mounted in each tubular frame for focusing the reflected light from the tab upon each of the photo cells as indicated by the light spread 33. Cell 24 is arranged to be illuminated from tab d and also from tab e through the aperture 35 which is provided with the lens 34 and the aperture is provided with a gate 36 whereby it may be closed when not required.

The construction at the lower edge of the card corresponds with that described at the upper edge in which light reflected from the tabs f, g, h, j and k is focused respectively upon the photo cells 26, 27, 28, 29 and 30. In this arrangement the cell 27 is illuminated from tab g and also from tab f through lens 37 and cell 28 is illuminated from tab h and also from tab g through lens 38 which may be shut off by the gate 39. This arrangement is merely illustrative of an adaption of the system of selection which admits of a variety of applications.

In this arrangement it will be noted that tab a reflects the full value of the light upon the cell 21 and may be arranged to cause this cell to establish a circuit. Tab b is black and fails to illuminate the cell 22 sufficiently to establish a circuit. Tab c illuminates cell 23 to establish a circuit, tab d is black and fails to influence cell 24 for operating conditions, but tab e operatively influences cell 24 through apertures 35 when gate 36 is open and tab e also operatively influences cell 25.

In the lower row tab f is partly black and partly white so that it has a limited light reflecting value which will not operatively influence the cell 26 unless this cell is sufficiently sensitive to operate under the restricted light conditions. Cell 27 is operatively influenced from tab g and it is also influenced from tab f through lens 37. In this case it is apparent that if cell 27 is not sensitive enough to be influenced by tab f alone it will not be influenced by another card in which the tab g is black and the tab f is black and white. If cell 27 is to be influenced in the latter case the more sensitive cell must be used. Cell 28 is influenced by tab g when the gate 39 is open and it may, or may not, be sufficiently sensitive to respond to the black and white tab h according to the conditions desired. Cell 29 is uninfluenced by the black tab j and cell 30 is influenced by tab k.

It is apparent that when the next card is exposed for scanning by the light cells that they will be influenced in accordance with the prearranged markings of the card and will effect the control of the system in accordance therewith.

One circuit arrangement that may be used in applying the light cells in Fig. 1 is shown in Fig. 2. Energy from B is controlled from switch 42 through wire 43 to cell 23 and through wire 44 to switch 61 and wire 60 through cells 24 and 25 in multiple to wire 59, switch 58, wire 57, switch 56, wire 65, cell 26, wire 66, cell 27, wire 67, switch 68, wire 69, cell 28, wire 71, switch 72, wire 70 to the inductive coupling 78 for the amplifying tube 79 to wire 80 and control relay 54, the return circuit being completed on wire 55. This provides a series multiple control group through the photo cells. If switch 61 is open and 45 is closed, the circuit is continued from wire 44, through switch 45, cell 22, wire 46, wire 47, cell 21, wire 48, inductive coupling 50 to wire 51 of amplifying tube 52 and wires 53, 64 and 80 to the control relay 54.

In the latter arrangement it will be noted that the controlling relay 54 is controlled by cells 21, 22 and 23 only, that is, by the tab $a$, $b$ and $c$ and if switch 47 is closed, cell 21 is cut out. If switch 58 is reversed the control is then limited to cells 23, 24 and 25 corresponding to tabs $c$, $d$ and $e$, the tab $c$ being the master tab and $d$ and $e$ being subject to the control by $c$ and being alternative to each other. When switch 58 is reversed the circuit is completed through the inductive coupling 62 to the amplifying tube 63 and by wires 64 and 80 to the control relay 54. When switch 56 is reversed, switch 42 is open, the selective control is limited to the lower row of photo cells and by reversing switch 68 may be restricted to the control by tabs $f$ and $g$, by leaving switch 68 as shown and 72 as shown the control is limited to tabs $f$, $g$ and $h$; by reversing switch 72 and 75 the control is limited to $f$, $g$, $h$ and $j$ and by reversing switch 72 from the position shown and leaving 68 and 75 as indicated the control includes tabs $f$, $g$, $h$, $j$ and $k$ in series. In the latter case it is apparent that any card that does not effectively energize all the light cells will not energize the control relay 54, and as hereinafter described, such card will be discarded without being photographed.

The cards 11 are stacked at 83 in the container 82, Fig. 3, which has a bottom 86, having an aperture in the field of vision of the lens 85 of the motion picture camera 84, thus each bottom card of the stack is in position to be photographed on a frame of the film as the mechanism is operated.

The mechanism is operated by the motor 87 connected with the electric supply 110, through a worm reduction gear 88, driving the main shaft 89, connected by the gears 90 and 91 with the cam 92 which engages the roller 94 of the lever 95, pivoted at 96 and opposed by the spring 97. This lever connects at 98 with the slide 15 so that when the depression 93 of cam 92 registers with roller 94, the spring 97 moves the bottom card 11 to the left into engagement with the discharge rollers 16, 16a. The bevel gear 99 mounted on the main shaft 89, through gear 100 drives shaft 101 which by the bevel gears 102 and 103 rotates the discharge roller 16. The gear 99 also rotates gear 104 connected by clutch 105 and clutch member 107 with shaft 127, which, through gears 128 and 129 operates the motion picture camera mechanism in synchronism with shaft 89. The motion picture camera is of the usual commercial type with an intermittent motion for feeding forward the film and with a shutter for exposing the film at the proper time and which is not shown in the drawings.

The continuous running of motor 87 will discharge the cards 11 from the stack 83, one at a time, but the camera mechanism is operated only when the clutch members 105, 107, are engaged. The clutch is controlled by the control magnet 111 through armature 106, pivoted at 108 and engaging the clutch member 105 at its outer end. When magnet 111 is energized the clutch is engaged and when it is deenergized spring 109 disengages the clutch.

The apparatus in Fig. 3 is controlled by relay 54, Fig. 2, from energy on wire B through contacts 112, bridged by member 113, wire 114, contact 115 of relay 54, wire 116, relay 117 and wire 118 to the return circuit. When relay 54 is energized and the cam 92 is in the normal position shown relay 117 is energized and establishes a holding circuit for itself through contact 119, wire 120, contact fingers 121 to wire B. The contact fingers 121 are bridged by the ring conductor 122 as the cam 92 rotates so that the gap 123 in this ring is moved away from the contact fingers 121 by the initial movement of cam 92. When relay 117 is energized the circuit is closed from wire B through contact 124 and wire 125 to the clutch control magnet 111 and return circuit on wire 126. It will be observed that the stick relay 117 cannot be energized unless the cam 92 is in the normal position and once it has been energized its circuit is maintained by the ring conductor 122 until the cam has made a complete revolution and disconnected the fingers 121 by the gap 123. It will thus be noted that the clutch members 105 and 107 cannot be engaged unless the cam 92 is in the normal position and the controlling relay 54 is energized. When these conditions occur the clutch is operated to operate the camera for one frame of the film and to open the shutter after the card is properly positioned for photographing. The relay 117 cannot be energized after the cam 92 has made its initial movement so that if the control relay 54 is not energized, the mechanism operates to discharge the lower card from the stack 83 without operating the camera, and it will continue to discharge the cards from the stack until the selective system energizes relay 54 to secure the photographic record desired.

Figure 8:
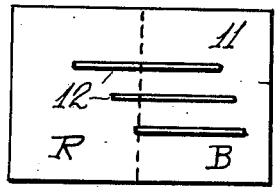
Fig. 8 is a simple form of a two color card for indexing purposes.
Figure 7:
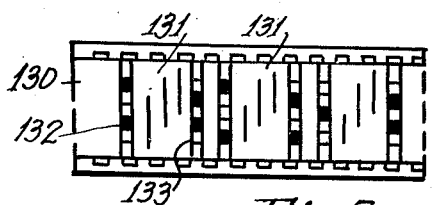
Fig. 7 is a plan view of a portion of motion picture film of the card index shown in Fig. 3.

Fig. 7 indicates a strip of film made from cards corresponding to that shown in Fig. 1 in which the frames 131 of the film 130 has photographed thereon at the top and bottom the markings of the tabs 132 and 133. When the selective system is applied in an elementary form a color scheme may be used on the cards instead of the tabs, such as indicated in Fig. 8 in which the card 11 has one half marked R colored in red, and the other half marked B colored blue and with a pair of photo cells responsive to these color values so that cards of any particular color could be selected from the stack by the system described.

The photographic transfers from the film to the paper stock is shown in Figs. 4 and 5 in which the motor 135, through the shaft 136 and the worm reduction 137 drives the shaft 138 of the film drum 140 and the printing drum 142 enclosed by the housing 139, 144 and 145. The centre of the film drum 140 is provided with one or more lights 146 which project the pictures on the frames of the film 141 through the prism 147 as indicated at 148, Fig. 5, upon the prism 149, Fig. 4, and through lens 150 to the apertures 143 in the drum 142 where an enlargement of the picture appears. The drum 142 is provided with radially spaced lightproof partitions 151 separating each of the windows 143 and isolating each frame of the film as the wheel rotates. This apparatus is fully described in my co-pending application above referred to. Shield 152 is provided in the interior of drum 140 to shut off the light on that portion of the mechanism where the film and the paper is fed to the printing wheel. The frames are printed by projecting the light beam from 146 through the film upon the paper sheets. The system of control of the sheets will operate for any system of printing from the film to the sheets.

The printing wheel is provided with an outer band 155 which passes around the wheel in the form of a belt and clamps the paper sheets 156 in place opposite the windows 143 during the printing operation. The feeding of the paper or envelopes to the printing wheel is electrically controlled and for this purpose the band 155 is taken off on a tangent at 157, over the rollers 158 and back to the wheel at 159. Opposite the portion 159 a feed belt 160, mounted on rollers 161 is provided and passes below the tray 161, carrying the envelopes 156, which are fed by the rotating blade 162 between the belt 160 and 159. Belt 160 is arranged to rotate with belt 159 and carry the paper stock forward to be clamped against the printing wheel.

The blade 162 is rotated by the gears 163 and 164, mounted on shaft 165 upon which the clutch member 166 is also mounted. This clutch member is engaged by the clutch member 167, controlled by the armature 168 of the magnet 169 and rotating with the shaft 170 driven by gears 171 and 172 from the motor shaft 136. When the magnet 169 is energized the shafts 165 and 170 rotate together and when this magnet is deenergized shaft 165 remains stationery and the paper feeding mechanism fails to operate. The envelopes 156 after passing around the printing wheel are thrown off by the paper guide 175 into the tray 176.

Motion picture film is supplied to the drum 140 from the reel 181, the film is indicated at 182, it passes through the projector 183 which is driven by the gears 188 and 189 from the shaft 170 with the usual intermittent motion. The film is looped at 186, and passes over the rollers 187 where it engages the drum 140. The light 184, through lens 185 and the individual focusing lens 190, Fig. 5, projects light through the portion of the film where the tabs of the cards are photographed and projects an enlargement upon the photo cells 191, 192, 193, 194 and 195. This again provides a selective control by photo-electric cells for printing the subjects of the film on the envelopes. An arrangement of electric circuits corresponding to Fig. 2 may be introduced into the system at this time for controlling the printing mechanism insofar as this may be desired or necessary. The film passes off the drum, around the roller 197 and is wound on the take-up reel 198. The loop of the film at 186 is made of such length that the frame projected by 183 corresponds with the next envelope to be fed by 162 as the film and the envelope approach the printing position. If the selective system omits a frame the photo cells fail to energize magnet 169 and the paper feed omits the envelope for that particular frame.

The circuit for operating the paper feed mechanism in Fig. 4, selectively, is shown in Fig. 6 and is so arranged that it either fails to operate or makes one complete cycle of operation for each frame of the film. The stick relay 203 is energized through cell 191, wire 201, cell 192, and wire 202 to relay 203 and return circuit 204. When relay 203 is energized, a circuit is established at 206, through wire 207 to clutch magnet 169. Relay 203 is a stick relay establishing its own circuit when energized through contact 205, wire 205a, to contact 173, controlled by cam 174 and shaft 165. In the normal position of cam 174, contact 173 is open but after the cam makes an initial movement this contact is closed and relay 203 is thereby maintained energized until the cam makes a complete revolution corresponding to one cycle of operation of the mechanism. It will thus be noted that the photo cells 191—195 establish the circuit of relay 203 and energize magnet 169 until cam 174 makes its initial movement and thereafter relay 203 is controlled by cam 174. In Fig. 6, only two of the photo cells are shown and the usual amplifying apparatus is not shown in the circuit.

Figure 9:
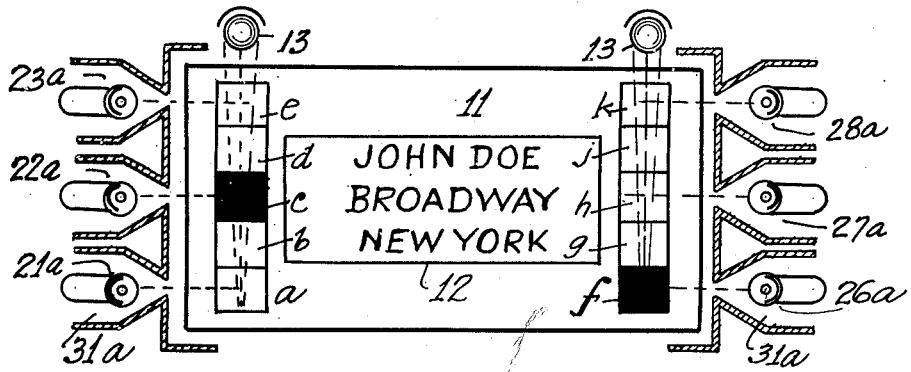
Fig. 9 shows another form of card and arrangement of scanning the same.

Another form of card is indicated in Fig. 9, in which the characteristic markings are provided at the ends of the card instead of at the sides. The photo cells 21a, 22a and 23a are enclosed by suitable tubes indicated at 31a and are arranged to focus on the markings a, c and e at one end of the card and the photo cells 26a, 27a and 28a are enclosed in suitable tubes 31a at the opposite end of the card and register with the markings f, h and k.

Figure 10:
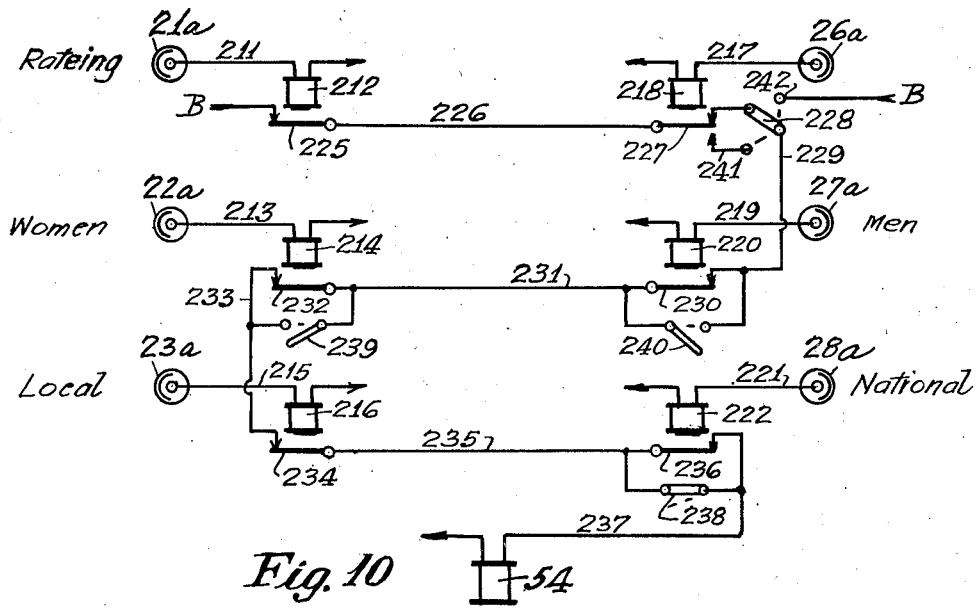
Fig. 10 is a circuit diagram that may be used to obtain selective results from the cards shown in Fig. 9.

A circuit for this arrangement is indicated in Fig. 10 in which the cell 21a may represent "rating", 22a may represent "women", 23a may represent "local", 27a may represent "men" and 28a may be "national." The cell 21a, through wire 211 energizes relay 212; cell 22a, through wire 213 energizes relay 214; cell 23a, through wire 215 energizes relay 216; cell 26a, through wire 217 energizes relay 218; cell 27a, through wire 219 energizes relay 220 and cell 28a, through wire 221 energizes relay 222.

When the relays are energized as shown the control relay 54 is energized from wire B through contact 225, wire 226, contact 227, switch 228, wire 229, contact 230, wire 231, contact 232, wire 233, contact 234, wire 235, contact 236 and wire 237 to relay 54. When switch 239 is closed the control by 22a is cut out, when switch 240 is closed the control by 27a is cut out and when switch 238a is closed the control by 28a is cut out. When switch 228 connects with wire 241 the control is obtained through relay 218 in the deenergized position instead of the energized position and when switch 228 connects to 242, the controls by 21a and 26a are eliminated and the other controls are subject to switch 228.

The invention may be applied complete as shown, or it may be used in any of its component parts, either with the system shown or with other systems and such application and the full equivalents thereof are contemplated herein.

Having thus described my invention, I claim:

1. An indexing system and means for transferring the subject of the index comprising a motion picture film having the subject on the frames of the film and having distinctive marks on each frame, a wheel for projecting the subject of each frame, a conveyor for conveying stock to which the index is to be transferred in separate sheets for each frame and upon which the subject is projected in said wheel, a drive mechanism co-operatively feeding the film and moving the conveyor, means for feeding the sheets to the conveyor, a photo-electric cell controlling said sheet feeding means and means for influencing said photoelectric cell by the distinctive marks on the frame.

2. An indexing system and means for transferring the subject of the index comprising a motion picture film having the indexed subjects on the frames of the film and having distinctive marks on each frame, a wheel for projecting the subject of each frame, a conveyor for conveying stock in separate sheets to which the index is to be transferred to receive the projected subject on said wheel, a drive mechanism for feeding the film and moving the conveyor, means for feeding the sheets to the conveyor, a plurality of photo-electric cells controlling said sheet feeding means and means controlling said photo-electric cells by a plurality of distinctive marks on said frame.

3. An indexing system and means for transferring the subject of the index comprising a motion picture film having the index subjects on the frames of the film and having distinctive marks on each frame, a wheel for projecting the subject of each frame, a conveyor for conveying stock in separate sheets to which the index is to be transferred to receive the projected subject, a drive mechanism for feeding the film and moving the conveyor, means for feeding the sheets to the conveyor, a plurality of photo-electric cells selectively influenced by the distinctive marks on said frames, a magnet having an operating circuit controlling said sheet feeding mechanism, said circuit being controlled by said cells.

4. An indexing system and means for transferring the subject of the index to envelopes for addressing the same, comprising a motion picture film having the index subjects on the frames of the film, a wheel for projecting the subject of each frame, conveyor for moving each envelope into the field of the projected subject to print the subject on the envelope, a drive mechanism for feeding the film and moving the conveyor, a feeding mechanism for feeding the envelopes to the conveyor and means for selectively controlling said feeding means to supply envelopes only for selected frames of the index.

5. An indexing system and means for transferring the subject of the index to envelopes for addressing the same, comprising a motion picture film having the index subjects on the frames of the film, means for projecting the subject of each frame, a rotating wheel for moving the envelope in the field of the projected subject to print the subject on the envelope, a feeding mechanism for feeding the envelopes to said wheel in position to be printed by the subject of the frames of the film and means for automatically controlling said feeding mechanism to omit an envelope for any particular frame.

6. A system for addressing envelopes, provided with a photo emulsion, comprising a printing wheel having a drum for receiving a motion picture film, and a larger drum for receiving envelopes, means optically connecting the film with the envelopes so as to print the subject of the frames of the film upon the envelopes, an endless belt surrounding the larger drum and means for feeding the envelopes to said belt in synchronism with the movement of the film.

7. A system for addressing envelopes selectively from a motion picture film photographically comprising a drum for the film and a drum for the envelopes, means optically printing the subject of the frames of the film upon the envelopes, an endless belt surrounding the drum for the envelopes to hold the envelopes in place, one portion of said belt extending in a tangent from said drum, means for feeding the envelopes to the tangent portion of the belt in synchronism with the movement of the film and means operated by the film selectively controlling said feeding means.

8. A system for addressing envelopes selectively from a motion picture film photographically having pre-arranged markings thereon, a photo-electric cell arranged to be operated by the markings on said film, a drum for receiving the film and a second drum for receiving the envelopes, a conveyor for feeding the envelopes to the drum in synchronism with the movement of the film, means for projecting the subject of the film frames including said markings, a photo-electric cell arranged to be operated by the markings on the film, a feeding mechanism for feeding envelopes to said conveyor and means controlling said feeding mechanism by said photo-electric cell.

9. An indexing system and means for transferring the subject of the index to separate sheets of paper, comprising a motion picture film having the index subjects on the frames of the film and indexing marks associated with each frame, means for projecting the subject of each frame, a conveyor for moving the sheets into the field of the projected subject to print the subject on the sheet, a mechanism for co-operatively operating the film and the conveyor, a feeding mechanism for feeding the sheets of paper to the conveyor, a clutch connecting said feeding mechanism with the operating mechanism and a plurality of independent means operated simultaneously by the indexing marks on the film for controlling said clutch.

10. An indexing system and means for transferring the subject of the index to separate sheets of paper, comprising a motion picture film having the index subjects on the frames of the film and having predetermined marks on each frame, means for projecting the index subjects on the film, a conveyor for moving the sheets into the field of the projected subjects to print the subjects on the sheets, a mechanism for co-operatively operating the film and the conveyor, a feeding mechanism for feeding the paper sheets to the conveyor, a circuit including a plurality of independent photoelectric cells controlling said feeding mechanism and means projecting light through the marked portions of the frames for operating said photo-electric cells.

11. An indexing system and means for transferring the subject of the index to separate sheets of paper, comprising a motion picture film having the index subjects on the frames of the film and having predetermined opaque spots on each frame, means for projecting the index subject of each frame, a conveyor for moving the paper sheets into the field of the projected subjects to print the subjects on the sheets, a feeding mechanism for feeding the paper sheets to the conveyor one sheet for each frame of the film, a circuit including a plurality of photo-electric cells independently controlling said feeding mechanism, means for moving the film and a light beam projected through said film upon said photo-electric cells and controlled by the opaque spots of the film.

12. An indexing system and means for transferring the subject of the index to separate sheets of paper, comprising a motion picture film having the index subjects on the frames of the film and having opaque spots on each frame arranged with reference to the subject of the index, means for projecting the index subject, a conveyor for moving the paper sheets into the field of the projected subject to print the subject on the sheets, a feeding mechanism for feeding the paper sheets to the conveyor, one sheet for each frame of the film, a plurality of independent photo-electric cells controlled by said opaque spots for influencing said photo-electric cells and a circuit controlled by said photo-electric cells controlling said feeding mechanism for selectively controlling the operation of said paper feeding mechanism.

13. An indexing system and means for transferring the subject of the index to separate sheets of paper, comprising a motion picture film having the index subjects on the frames of the film and having two rows of predetermined marks on each frame, means for projecting the indexed subject, a conveyor for moving the paper sheets into the field of the projected subject to print the subject on the sheet, a feeding mechanism for feeding the paper sheets to the conveyor one sheet for each frame of the film, a drive mechanism for feeding the film and moving the conveyor and independent means controlled by each projected mark on the frame for controlling the operation of the paper feeding mechanism.

14. An indexing system and means for transferring the subject of the index to separate sheets of paper, comprising a motion picture film having the index subjects on the frames of the film and having marks on each frame arranged with reference to the subject of the index, means for projecting the indexed subjects, a conveyor for moving the paper sheets into the field of the projected subject to print the subject on the sheet, a feeding mechanism for feeding a paper sheet to the conveyor for each frame of the film, a drive mechanism for co-operatively feeding the film and moving the conveyor and independent photo cells simultaneously controlled each by one of the marks on the frame for selectively controlling said paper feeding mechanism to control the delivery of a paper sheet to the conveyor upon which the subject of the frame is to be printed.

15. An indexing system and means for transferring the subject of the index to separate sheets of paper, comprising a motion picture film having the index subjects on the frames of the film, a printing wheel for projecting the index subjects as it rotates, a conveyor for moving the sheets into the field of the projected subjects on said wheel to print the subjects on the sheets, a mechanism for co-operatively operating the film, the conveyor and the printing wheel, a stack of paper sheets, and a feeding mechanism operating in synchronism with said film and said conveyor for feeding paper sheets one at a time from said stack to said conveyor and said printing wheel to register with the projected subjects.

16. An indexing system and means for transferring the subject of the index to separate sheets of paper, comprising a motion picture film having the index subjects on the frames of the film, a printing wheel for projecting the index subjects, a conveyor belt having a portion of the belt tangent to the printing wheel, a feeding mechanism for feeding paper sheets one at a time to said tangent portion whereby they are conveyed to the field of the projected subjects on said wheel to print the subjects on the sheets and a drive mechanism for co-operatively operating the conveyor belt, the feed mechanism, the film and the printing wheel.

ROBERT STUART.